Jan. 22, 1924.

C. W. BECK 1,481,534

STEERING WHEEL

Filed June 18, 1923     2 Sheets-Sheet 1

Inventor
Charles W. Beck.

By Whittemore Hulbert Whittemore
 + Belknap      Attorneys

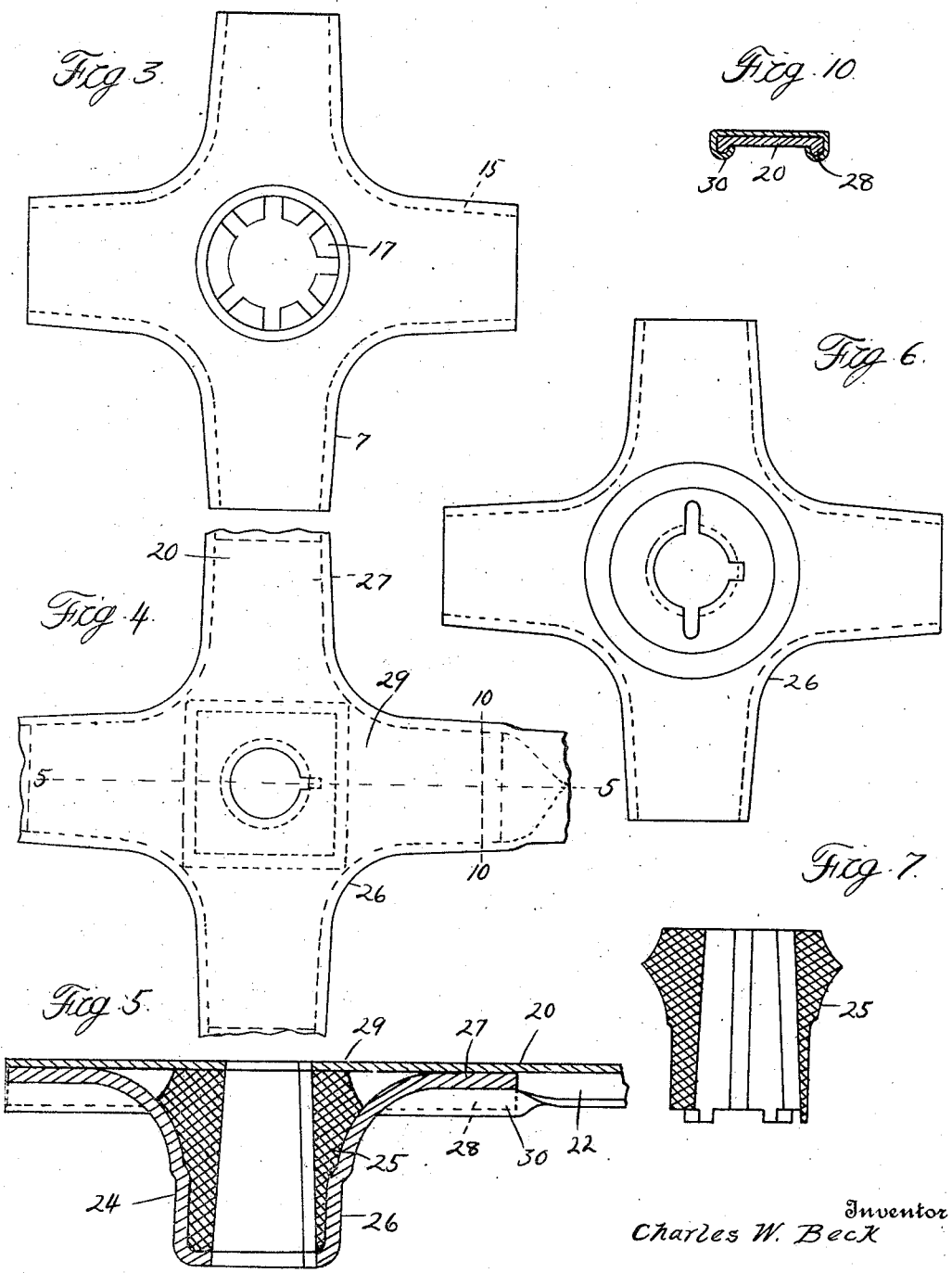

Patented Jan. 22, 1924.

1,481,534

UNITED STATES PATENT OFFICE.

CHARLES W. BECK, OF DETROIT, MICHIGAN, ASSIGNOR TO BECK-FROST CORPORATION, OF DETROIT, MICHIGAN, A CORPORATION OF MICHIGAN.

STEERING WHEEL.

Application filed June 16, 1923. Serial No. 645,822.

*To all whom it may concern:*

Be it known that I, CHARLES W. BECK, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to steering wheels for motor vehicles, boats and the like, but refers particularly to wheels wherein the spider or metal part is preferably of the built-up and assembled type.

An object of the invention is to provide a strong and durable steering wheel in which the metal parts of the spider are rigidly secured together by simple and effective means.

Another object is to provide a strong and durable wheel which is simple in construction and which can be manufactured at a comparatively low cost.

With the above and other objects in view, the invention consists of certain novel features of construction, combination and arrangement of parts as will be more fully described and particularly pointed out in the appended claims.

In the accompanying drawing:—

Figure 3 is a top plan view of a hub;

Figure 4 is a top plan view of a slightly modified form of construction;

Figure 5 is a sectional view taken on line 5—5 of Figure 4;

Figure 6 is a top plan view of a hub illustrated in Figure 4;

Figure 7 is a vertical sectional view through the core of the hub illustrated in Figure 4;

Figure 10 is a sectional view taken on line 10—10 of Figure 4.

Figure 1:
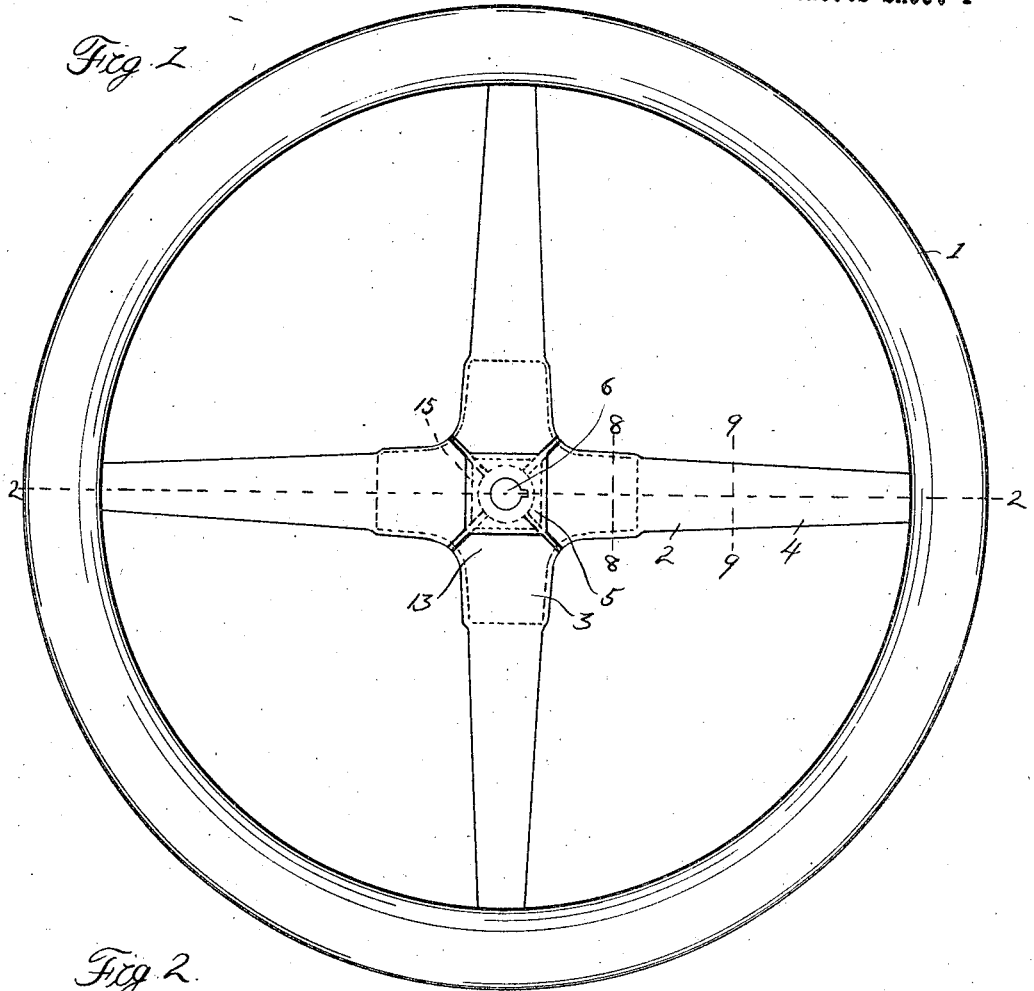
Figure 1 is a top plan view of a steering wheel embodying my invention.
Figure 2:
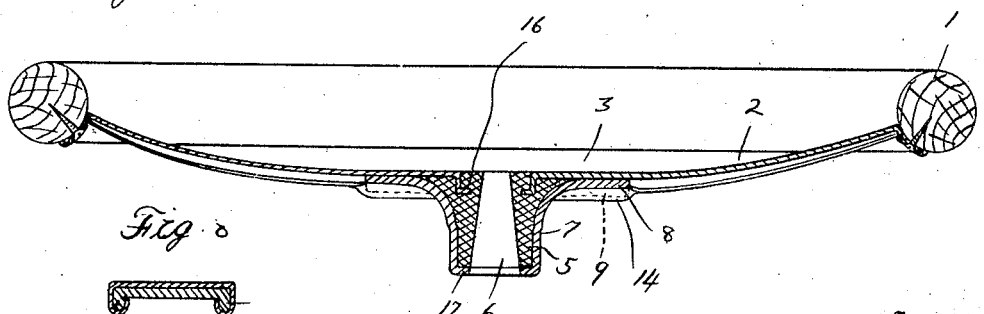
Figure 2 is a sectional view taken on line 2—2 of Figure 1.
Figure 8:
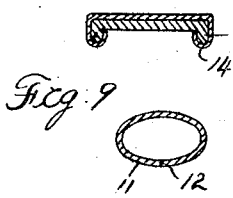
Figure 8 is a sectional view taken on line 8—8 of Figure 1.
Figure 9:
Figure 9 is a sectional view taken on line 9—9 of Figure 1.

Referring now to the drawing in which like characters of reference designate corresponding parts throughout the several views, the numeral 1 designates a rim, preferably of wood, detachably secured to a metallic spider 2 which includes a hub 3 and a plurality of radially extending arms 4.

The hub is preferably formed of two parts and preferably comprises a core 5 having a tapering bore 6 for receiving a steering stem (not shown) and an outer shell or casing 7 which is preferably a sheet metal stamping and which is preferably provided at its upper open end with a series of integral radially extending projections 8. These projections preferably support the arms 4 of the spider and are preferably provided at their opposite side edges with depending flanges 9. The lower edges of these flanges preferably incline upwardly from the outer ends thereof to their inner ends while the inner ends of the flanges of one projection preferably merge into the inner ends of the flanges of the adjacent projections as shown at 10.

The arms 4 are also preferably sheet metal stampings and are preferably provided at their opposite edges throughout the major portion of their length with depending flanges 11 which are preferably curved inwardly so that the edges thereof meet as shown at 12. The arms 4 are also preferably provided with flared portions 13 at their inner ends which have marginal depending flanges 14 that connect into the flanges 11 and that are preferably crimped over the depending flanges 9 of the projections 8. The flared portions 13 of the arms are preferably spaced slightly apart and the inner ends thereof are preferably curved as shown at 15.

For strengthening the wheel construction, the flared portions 13 of the arms are preferably depressed at their inner ends as shown at 16 and are preferably embedded in the core 5 which is preferably cast in the shell 7 of the hub. The metal of the core located in the depressed portions of the arms is preferably in the form of a square and thus serves as an efficient anchor to prevent relative movement of the core. The shell is also preferably provided at its lower end with a series of spaced lugs or projections 17 which preferably extend inwardly and are embedded in the core 5. These projections also prevent any relative movement between the core and the shell.

In the process of construction, the arms 4 are assembled upon the shell 7 and the flanges 14 are crimped over the flanges 9.

The core is then cast into the shell and around the inner ends of the arms as shown to provide a strong and durable construction in which the parts are permanently and rigidly secured together.

In the modification illustrated in Figures 4 and 7 inclusive, I have shown a construction in which the arms 20 of the spider are formed from a single sheet of metal and are detachably secured at their outer ends to a suitable rim (not shown) which is preferably formed of wood. The arms 20 are also preferably provided with flanges 22 which extend downwardly from the side edges of the arms throughout the major portion of their length and which are preferably curved inwardly so that the edges thereof meet.

The hub 24 of this construction is also preferably formed of two parts and preferably comprises a core 25 and an outer shell or casing 26, the latter preferably being a sheet metal stamping having a series of projections 27 extending radially therefrom at its upper open end. These projections support the arms 20 of the spider and are preferably provided at their opposite side edges with depending flanges 28. The flared portions 29 of the arms 20, in this construction, are preferably formed integral with each other and are preferably provided with marginal depending flanges 30 that connect into the flanges 20 and that are preferably crimped over the depending flanges 28 of the projections 27.

In the process of construction the core 25 is cast into the shell 26 and the assembled hub is then secured to the integral arms 20 by crimping the flanges 30 over the flanges 28.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:—

1. In a steering wheel, a hub having a shell and a core in said shell, a series of projections extending radially from said shell, and a series of spider arms carried by said projections.

2. In a steering wheel, a hub having a shell and a core in said shell, a series of projections extending radially from said shell, and a series of spider arms engaging said projections and having portions embedded in said core.

3. In a steering wheel, a hub having a shell and a core cast into said shell, said shell having a series of projections at one end thereof embedded in said core to prevent relative movement between said core and shell, said shell also having a series of radially extending projections at the opposite end, and a series of spider arms carried by the last mentioned projections.

4. In a steering wheel, a hub having a shell and a core cast into said shell, projections extending radially from said shell, flanges carried by said projections, and spider arms mounted on said projections and having flanges crimped over the flanges thereof.

5. In a steering wheel, a hub formed of two parts, one part being cast into the other, projections extending radially from one of said parts, and spider arms carried by said projections.

6. In a steering wheel, a hub having a shell and a core cast into the wheel, projections extending radially from said shell, and spider arms secured to said projections and core.

7. In a steering wheel, a hub, a core immovably anchored in said hub, and spider arms embedded in said core.

8. In a steering wheel, a hub having radial projections, a core permanently anchored in the hub, and spider arms engaging said projections and embedded in the core.

9. In a steering wheel, a hub having radially extending projections provided with depending flanges, a core rigidly anchored in said hub, and spider arms engaging said projections and embedded in said core, said arms also having flanges secured to the flanges aforesaid.

10. In a steering wheel, a hub having a shell terminating at one end in a series of spaced inwardly extending projections, and a core in said shell having portions located between said projections.

11. In a steering wheel, a hub having a shell and a core in said shell, and a series of spider arms connected to said shell.

In testimony whereof I affix my signature.

CHARLES W. BECK.